H. HELLWEG.
PISTON.
APPLICATION FILED JULY 29, 1918.

1,321,525.

Patented Nov. 11, 1919.

Inventor:
Henry Hellweg.
By Bottum Bottum Hudnall & Lecher
Attorneys.

UNITED STATES PATENT OFFICE.

HENRY HELLWEG, OF MILWAUKEE, WISCONSIN, ASSIGNOR OF ONE-HALF TO LOUIS SCHLESINGER, OF MILWAUKEE, WISCONSIN.

PISTON.

1,321,525.  Specification of Letters Patent.  Patented Nov. 11, 1919.

Application filed July 29, 1918. Serial No. 247,146.

*To all whom it may concern:*

Be it known that I, HENRY HELLWEG, a citizen of the United States, residing at Milwaukee, in the county of Milwaukee and State of Wisconsin, have invented certain new and useful Improvements in Pistons, of which the following is a specification, reference being had to the accompanying drawing, forming a part thereof.

This invention relates more particularly to hollow trunk pistons which have a head at one end and are open at the other, such as are used in internal combustion engines.

The main objects of the invention are to prevent overheating of the piston head, the formation of an insulating carbon deposit on the head and adjacent parts of the piston wall, the deterioration of the lubricating oil by overheating and cracking and its contamination with distintegrated carbon, which causes wear and injury of the piston, cylinder and wrist pin bearing or bearings; to collect the oil thrown into the piston by the splash of the crank and connecting rod and to conduct it to the wrist pin bearing or bearings; to provide for and maintain circulation of air in the closed end of the piston, and generally to improve the construction and operation of pistons of the type referred to.

It consists in the construction, arrangement and combination of parts as hereinafter particularly described and pointed out in the claims.

In the accompanying drawing like characters designate like or similar parts in the several figures.

Figure 1:
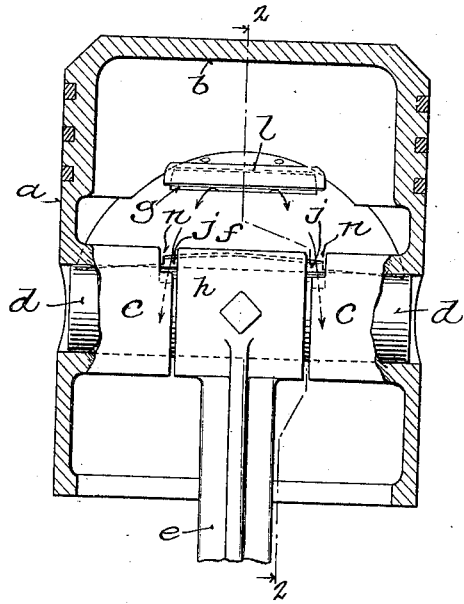
Figure 2:
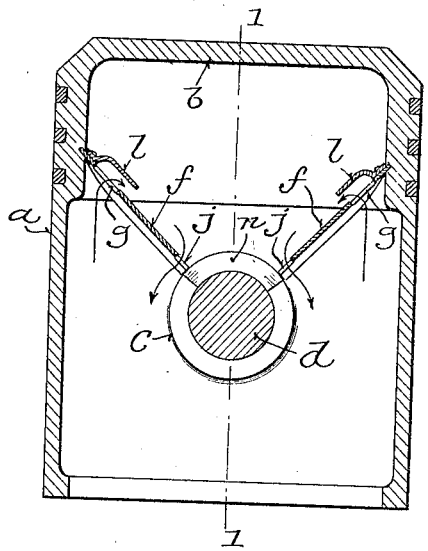
Figure 3:
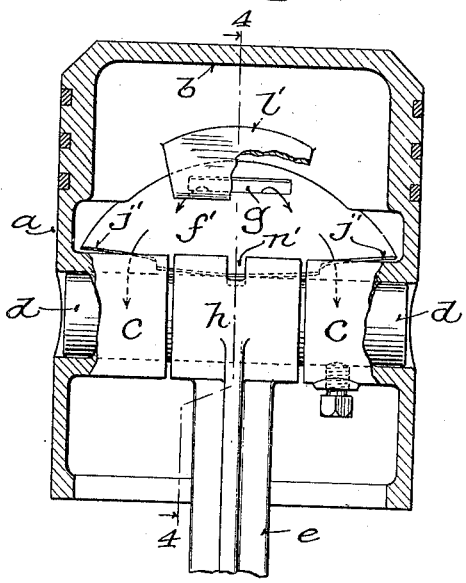
Figure 4:
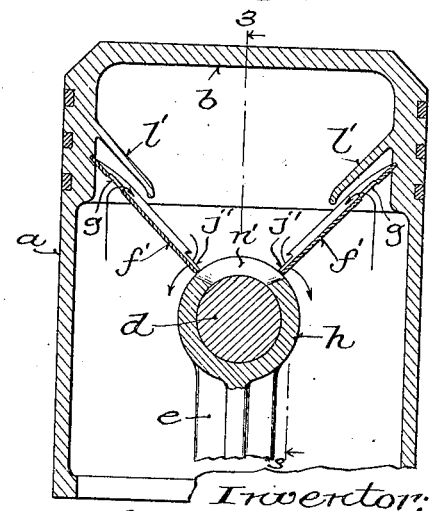

Figure 1 is a longitudinal section of a piston embodying the invention, in a plane indicated by the line 1—1, Fig. 2, cutting the axis of the wrist pin, which is fixed in the connecting rod and turns in the piston; Fig. 2 is a similar section of the piston in a plane indicated by the line 2—2, Fig. 1, and cutting the wrist pin at right angles; Fig. 3 is a section similar to Fig. 1, in a plane indicated by the line 3—3, Fig. 4, of a modified construction in which the wrist pin is fixed in the piston and the connecting rod turns on the pin; and Fig. 4 is a section similar to Fig. 2 of the construction shown by Fig. 3, in a plane at right angles thereto and indicated by the line 4—4, Fig. 3.

Referring to Figs. 1 and 2, $a$ designates a trunk piston of the usual construction closed by a head $b$ at one end, and open at the other end. It is formed as usual, with hubs or bosses $c, c$, extending inwardly from opposite sides thereof in alinement with each other for a wrist pin $d$, pivotally connecting the rod or pitman $e$ with the piston.

In accordance with the present invention the piston is provided with deflecting plates $f$, arranged to prevent lubricating oil from being thrown into the closed end of the piston against the head $b$, and adjacent parts of the cylindrical piston wall to provide for the circulation of air within the closed end of the piston, and to catch and conduct oil entrained with the air to the wrist pin bearing or bearings when the piston is in operation.

These plates may be cast integrally with the piston, but for the sake of lightness and dissipation of heat are preferably formed separately of sheet metal and cast into the piston as shown. They extend at an inclination from opposite sides of the piston toward its open end to the upper part of the hubs or bosses $c$, and are formed adjacent to their outer edges next or close to the cylindrical wall of the piston, with openings $g$, and also adjacent to the sleeve $h$ at the end of the connecting rod $e$, with notches or openings $j$.

Baffle plates $l$, which are also preferably made of sheet metal and riveted, welded or otherwise fastened to the plates $f$, extend inwardly and downwardly over the openings $g$, so as to prevent oil entrained with the air and passing through said openings from coming in contact with the piston head $b$ and cylindrical wall of the piston above the plates $f$, and to direct the oil downwardly upon the plates $f$, by which it is conducted to the bearings of the wrist pin $d$ in the hubs or bosses $c$.

These hubs or bosses may be formed in their upper sides at the lower edges of the plates $f$ with openings, or may be cut away or formed with notches $n$ at their inner ends, to facilitate the passage of oil from said plates to the wrist pin, or sufficient oil for the lubrication of the wrist pin may be supplied thereto through the usual spaces between the bosses $c$ and sleeve $h$.

The plates $f$ are preferably curved or inclined slightly downward toward the ends, as shown, and thereby tend to cause the oil deposited upon them to flow from their central portions toward the bosses c and into the openings or notches therein, or the spaces between the piston bosses c and the connecting rod sleeve h.

In the operation of the piston on its strokes downward or toward the crank, air passes with entrained oil through the openings g in the deflecting plates f against the baffle plates l, by which it is directed downward toward the wrist pin and escapes through the openings j. A circulation of air is thus produced and maintained through the space between the head b and wrist pin d while the piston is in operation, and prevents the piston head from being heated by the explosion and combustion of the fuel charges, to which the piston head is directly exposed, to a temperature which would produce premature ignition of the fuel charges, the burning, cracking or baking of the lubricating oil in contact with other parts of the piston, and carbonization of oil in the packing ring grooves with which the piston is provided, as shown.

The plates f and l, substantially closing the spaces between the piston bosses c, connecting rod sleeve h and the opposite sides of the piston, form a shield which prevents oil from being thrown into the upper closed end and more highly heated end of the piston.

The oil caught by the plates f, flows downwardly thereon to the openings or notches in the bosses c, and the spaces between them and the sleeve h, through which it flows to the wrist pin d and into the bosses, keeping the pin bearings thoroughly lubricated while the piston is in action.

Referring to Figs. 3 and 4, showing a modified construction embodying the principle and essential features of the invention as applied to a piston in which the wrist pin d is fastened in the bosses c, and the connecting rod sleeve h turns on the pin, the deflecting plates f' are like the plates f, formed adjacent to the piston wall with openings g, but the notches or openings j' at the lower edges of the plates are located next to the bosses c and between them the plates extend close to the connecting rod sleeve h, which is formed in the upper side with an elongated transverse slot or opening n' to receive oil from the lower edges of the deflecting plates. These plates are preferably curved or inclined slightly downward toward the center, so as to cause the oil caught thereon to flow toward the slot or opening n'. The baffle plates l' are in this instance shown as cast integrally with the wall of the piston.

While the deflecting and baffle plates may be cast integrally with the piston it is difficult to so construct them without materially increasing the weight of the piston, which is objectionable. They are therefore preferably made as shown in Figs. 1 and 2, of light sheet metal and cast into the wall of the piston so that they do not appreciably increase its weight and more readily give up heat.

The purpose, functions and advantages of both constructions of deflecting and baffle plates are substantially the same, one being specially adapted to direct oil to the bearings at the ends of the wrist pin in the piston bosses c, while the other is specially adapted to direct oil to the bearing of the connecting rod sleeve h, on the central part of the wrist pin.

Various modifications in the details of construction and arrangement of parts of the piston may be made without departure from the principle and scope of the invention as defined in the following claims.

I claim:

1. A piston having a head at one end and open at the other end, and an internal shield provided with openings between the closed and open end of the piston and adapted to maintain a circulation of air within, and prevent the splash of oil against, the closed end of the piston when it is in operation.

2. A piston having a head at one end and open at the other end and provided between its open and closed ends with wrist pin bosses, and deflecting plates between the wrist pin bosses and opposite sides of the piston formed with openings for maintaining a circulation of air within the closed end of the piston and adapted to intercept oil splashed into the open end of the piston and deliver it to the wrist pin.

3. A piston having a head at one end and open at the other end, inclined deflecting plates extending from opposite sides toward the center and open end of the piston and formed with air circulating openings adjacent the sides of the piston, and baffle plates extending over said openings between said plates and the piston head.

4. A piston open at one end and having a head at the other end, and a wrist pin passing transversely therethrough, inclined deflecting plates extending from opposite sides of the piston toward its open end and toward the wrist pin and formed with circulating openings adjacent to the sides of the piston and to the wrist pin, and baffle plates extending over the openings adjacent to the sides of the piston between the deflecting plates and the piston head, the deflecting plates being arranged to collect and conduct oil to the wrist pin.

5. A piston open at one end and having a head at the other end, and internal bosses for a wrist pin, inclined deflecting plates extending from opposite sides of the piston toward its open end to the bosses and formed adjacent to the side of the piston and to and between the bosses with openings, said plates being arranged to collect and conduct oil to the wrist pin.

6. A piston open at one end and having a head at the other end, and internal bosses for a wrist pin, inclined deflecting plates extending from opposite sides of the piston toward its open end and toward the wrist pin and formed with openings adjacent to the piston and adjacent to their opposite edges, and baffle plates extending over said openings between the deflecting plates and the piston head, said plates being arranged to prevent oil splashing against the piston head and to maintain a circulation of air between the piston head and wrist pin bosses, and the deflecting plates being arranged to collect oil and conduct it to the wrist pin.

7. A piston open at one end and closed at the other end by a head and formed between its open and closed ends with bosses for a wrist pin, and a sheet metal shield located between the wrist pin bosses and opposite sides of the piston and having openings adapted to maintain a circulation of air within the closed end of the piston, the shield being constructed and arranged to prevent oil splashed into the open end of the piston from coming into contact with its closed end.

8. A piston open at one end and closed at the other end by a head and having alined internal bosses for a wrist pin, and sheet metal deflecting plates attached to opposite sides of the piston and extending therefrom at an inclination toward said bosses and the open end of the piston, said plates being formed with air circulating openings adjacent to their outer and inner edges and being provided with baffle plates extending over the outer openings toward the center of the piston.

In witness whereof I hereto affix my signature.

HENRY HELLWEG.

Copies of this patent may be obtained for five cents each, by addressing the "Commissioner of Patents, Washington, D. C."